United States Patent [19]

Judell et al.

[11] Patent Number: 4,750,141

[45] Date of Patent: Jun. 7, 1988

[54] METHOD AND APPARATUS FOR SEPARATING FIXTURE-INDUCED ERROR FROM MEASURED OBJECT CHARACTERISTICS AND FOR COMPENSATING THE MEASURED OBJECT CHARACTERISTIC WITH THE ERROR, AND A BOW/WARP STATION IMPLEMENTING SAME

[75] Inventors: Neil H. Judell, Plainfield, N.J.; Noel S. Poduje, Needham Heights, Mass.

[73] Assignee: ADE Corporation, Newton, Mass.

[21] Appl. No.: 802,049

[22] Filed: Nov. 26, 1985

[51] Int. Cl.$^4$ .......................... G01B 7/00; G01B 7/28; G01C 25/00

[52] U.S. Cl. .................................. 364/550; 364/559; 364/571; 33/550; 33/551; 73/865.8

[58] Field of Search ................. 73/865.8; 33/549–552; 356/152; 364/550, 551, 559, 571; 369/43

[56] References Cited

U.S. PATENT DOCUMENTS

| | | | |
|---|---|---|---|
| 3,899,832 | 8/1975 | Hunyar | 33/552 |
| 4,052,603 | 10/1977 | Karlson | 364/171 |
| 4,154,530 | 5/1979 | Connolly, Jr. et al. | 356/152 |
| 4,184,263 | 1/1980 | Tatsumi et al. | 33/550 X |
| 4,342,089 | 7/1982 | Hall | 364/571 X |
| 4,357,668 | 11/1982 | Schwartz et al. | 364/571 X |
| 4,488,249 | 12/1984 | Baker | 364/571 |
| 4,603,487 | 8/1986 | Matsunata | 33/551 |

Primary Examiner—Parshotam S. Lall
Assistant Examiner—Joseph L. Dixon
Attorney, Agent, or Firm—Weingarten, Schurgin, Gagnebin & Hayes

[57] ABSTRACT

The present invention discloses apparatus and method for electronically determining and compensating mechanical fixture induced errors from desired object related information in a measurement system such that data acquisition is obtained with a precision very much better than the manufacturing tolerances of the mechanical fixture. In the preferred embodiment, bow and warp profiles of a semiconductor wafer are obtained with an X, $\theta$, and Z moveable wafer-receiving chuck that have an accuracy very much better than the mechanical tolerances of the X, $\theta$, and Z moveable chuck. The system provides for measurement of objectrelated information in plural orientations. Signal processing is disclosed for separating out of the object related information X and $\theta$ fixture induced error contributions to the data arising from mechanical tolerance of the fixture. Signal processing is disclosed for compensating bow and warp profiles of semiconductor wafers in accordance with the X and $\theta$ contributions fixture induced error are disclosed in order to provide a measurement accuracy not limited by the mechanical tolerances of the X, $\theta$, and Z moveable wafer after receiving chuck.

27 Claims, 5 Drawing Sheets

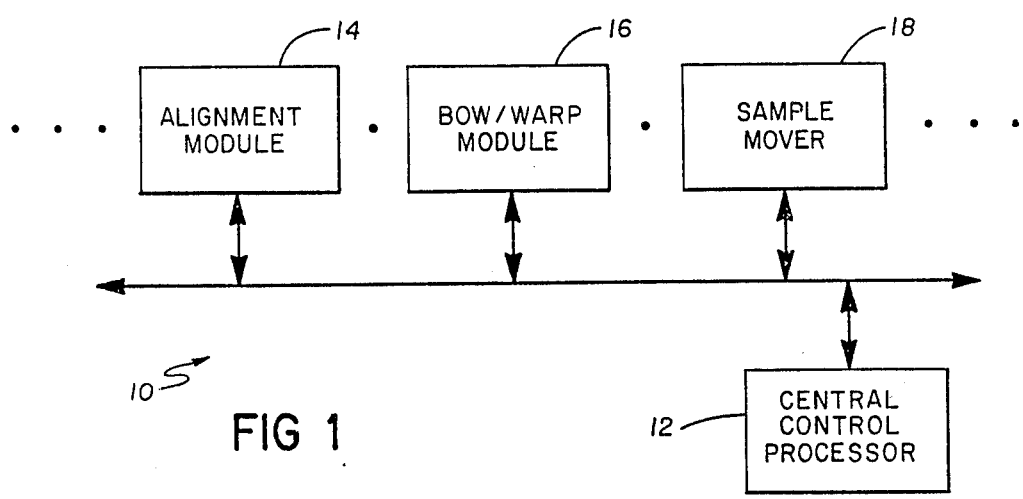
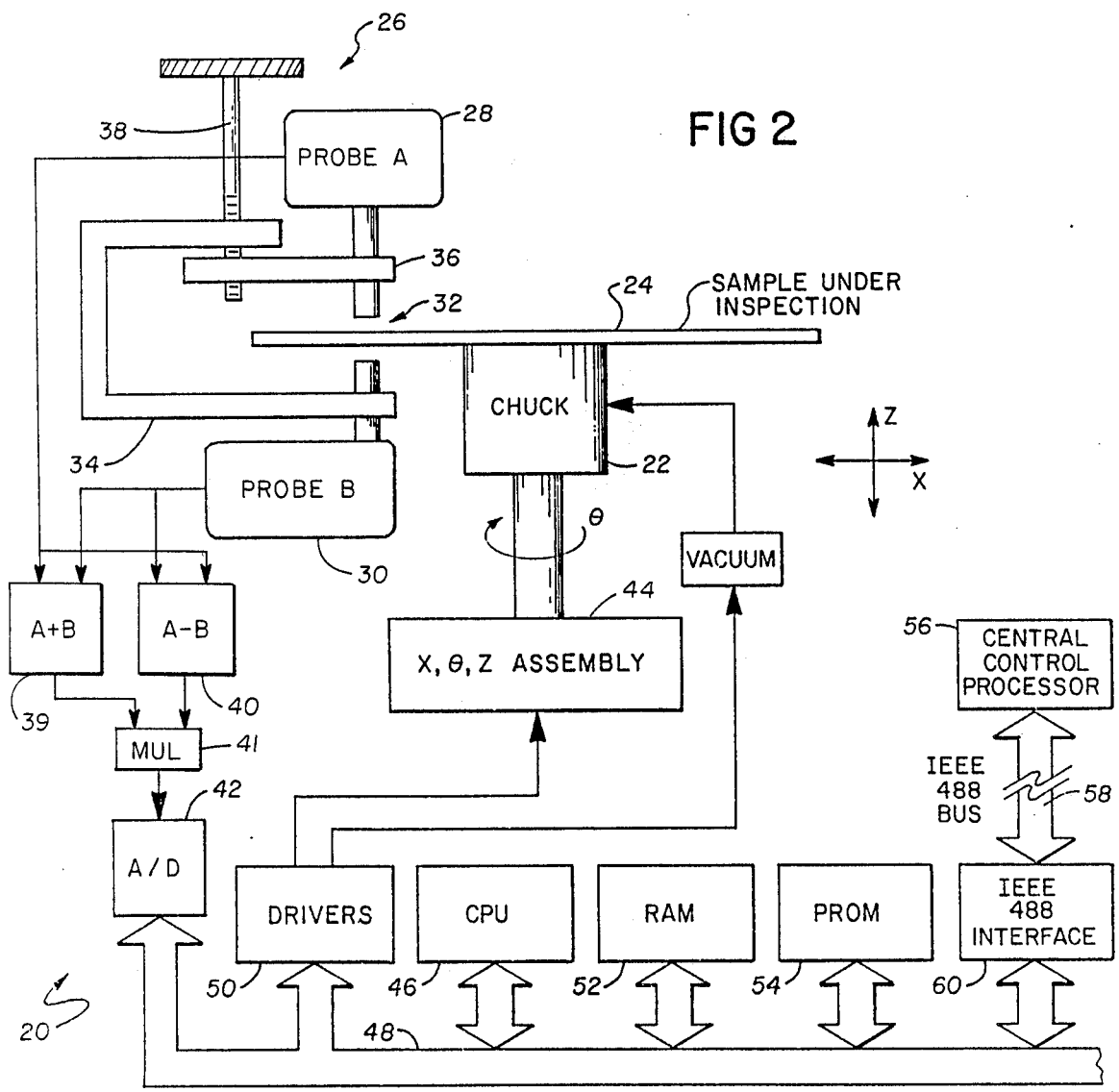

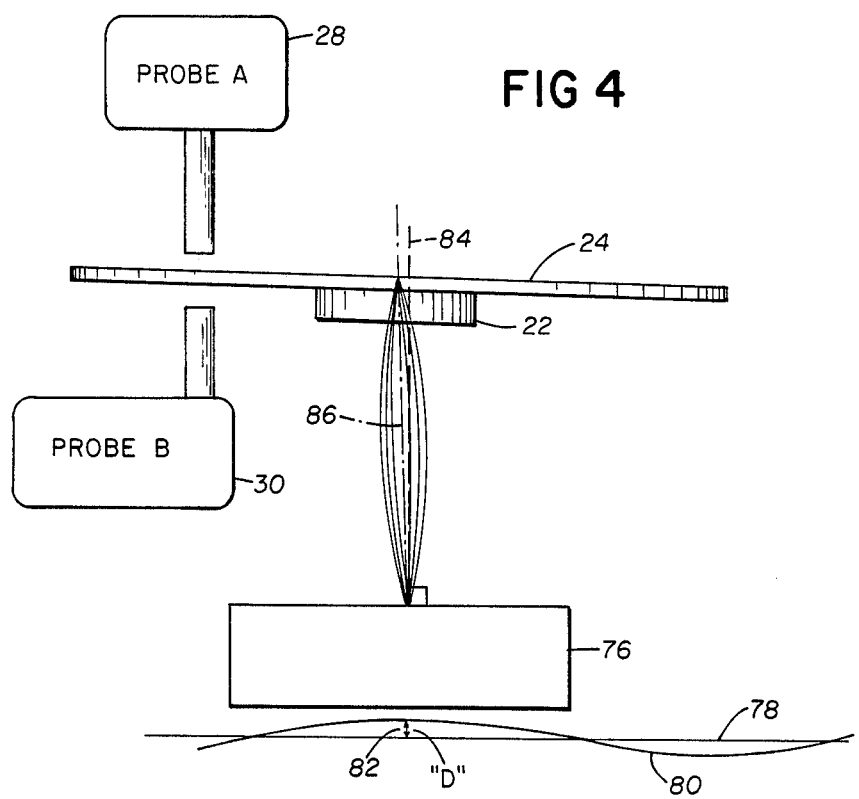
FIG 4
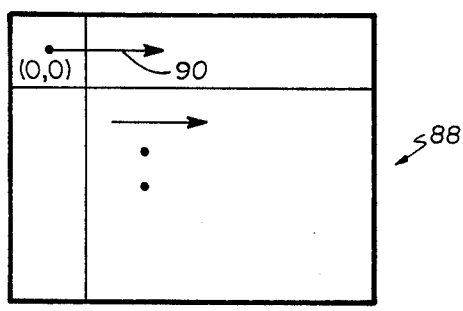
FIG 5a  $M_1(x,\theta)$
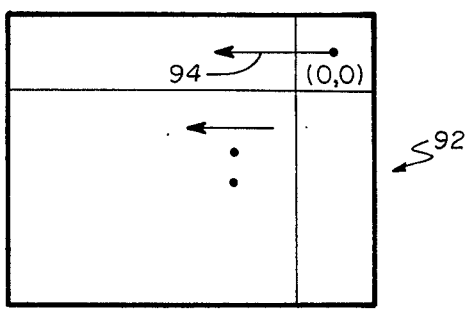
FIG 5b  $M_2(x,\theta)$
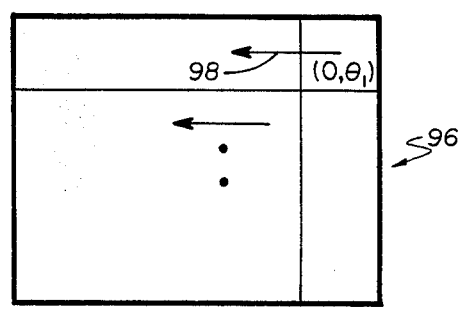
FIG 5c  $M_3(x,\theta)$
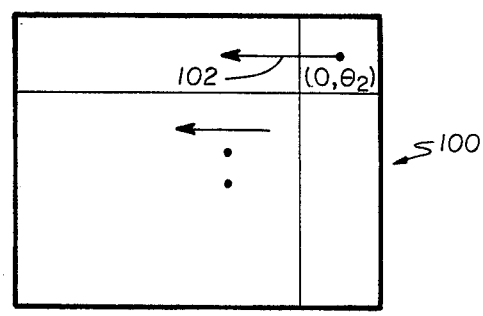
FIG 5d  $M_4(x,\theta)$

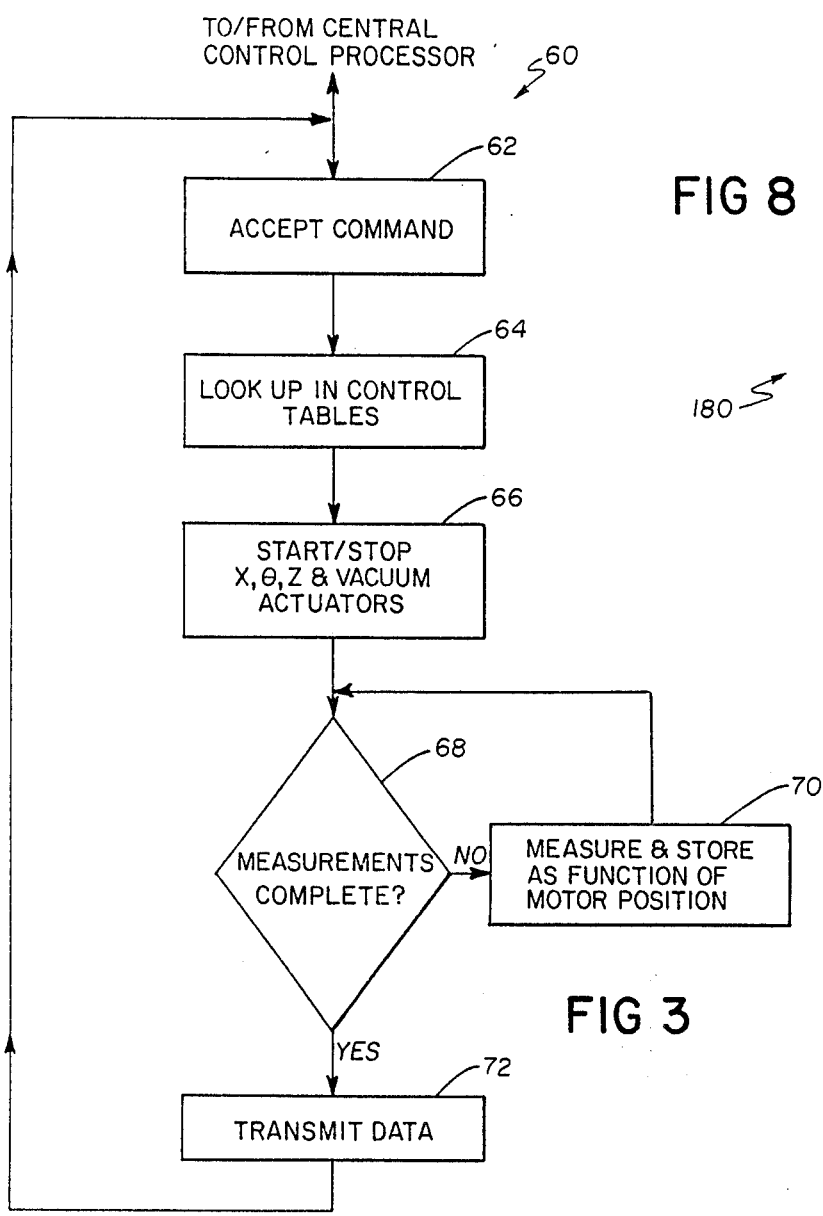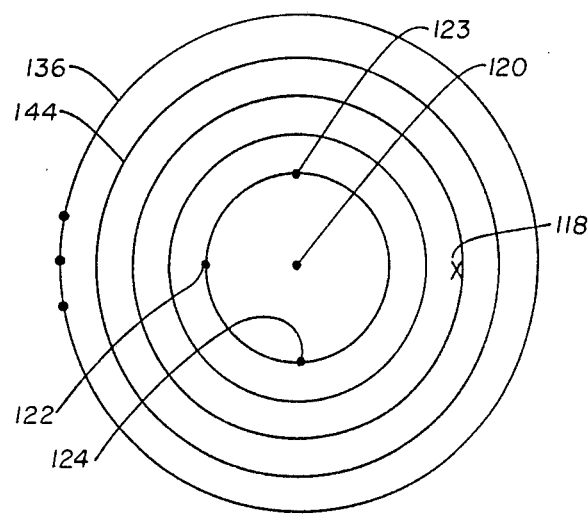

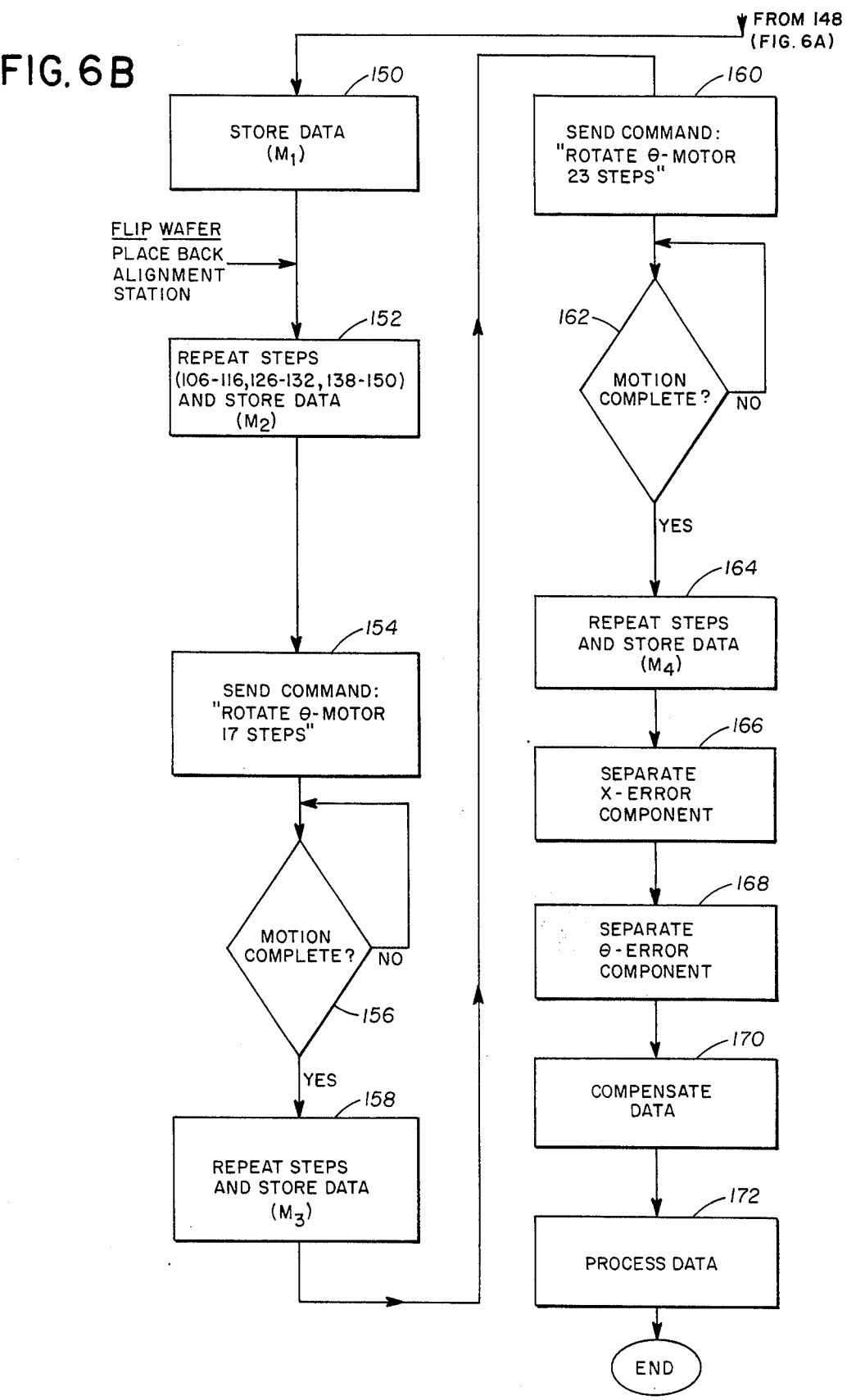

METHOD AND APPARATUS FOR SEPARATING FIXTURE-INDUCED ERROR FROM MEASURED OBJECT CHARACTERISTICS AND FOR COMPENSATING THE MEASURED OBJECT CHARACTERISTIC WITH THE ERROR, AND A BOW/WARP STATION IMPLEMENTING SAME

FIELD OF THE INVENTION

This invention is directed to the field of measurement and testing, and more particularly, to a novel wafer bow and warp station.

BACKGROUND OF THE INVENTION

Information representative of the degree of the bow and/or warp of semiconductor wafers is useful during many of the phases of the integrated circuit fabrication process. Bow and warp stations are called upon to provide the necessary information, and in such a way that the confidence level of the bow and warp data is not limited by the mechanical tolerances of the station. In the past, this has necessitated the provision of such precisely machined wafer receiving fixtures as optically-flat stationary platforms and precision-machined moveable platforms. As will be appreciated, such approaches not only produce costs that exponentially grow with the degree of mechanical tolerance provided but also result in comparatively-complex and/or difficult-to-use and maintain stations.

SUMMARY OF THE INVENTION

The bow and warp station of the present invention is based in the recognition that it is possible to electronically determine the mechanical fixturing induced errors and to compensate the bow and warp profile accordingly so that bow and warp data acquisition with a precision very much better than the manufacturing tolerances of the mechanical fixture of the station thereby becomes achievable.

In general terms, the present invention contemplates a measurement station having a sensor for obtaining input data representative of an intended characteristic associated with one or more identifiable locations of an object to be measured. A fixture is contemplated for supporting the object in such a way that the sensor can obtain input data representative of the intended characteristic associated with the one or more identifiable locations of the object. First signal processing means are contemplated operative in response to the input data for separating the input data into a fixture-related error component and an intended characteristic-related desired component. Second signal processing means are contemplated operative in response to the input data and to the fixture-related error component to provide output data only representative of the intended characteristic associated with the object at the one or more identifiable locations thereof.

In the preferred embodiment, the present invention discloses a wafer bow and warp station that includes a processing means operatively coupled to a capacitive sensing head and to an X, $\theta$, and Z moveable vacuum chuck assembly. The bow and warp station is operative to obtain an X calibration and a $\theta$ calibration of the X, $\theta$, and Z assembly fixture errors, and is operative thereafter to provide X-error and $\theta$-error compensated bow and warp data. The capacitive sensing head is operative to provide first input data representative of the distance to the median center line of each of a plurality of identifiable right side-up locations of a wafer controllably positioned successively therein by the X, $\theta$, and Z movable vacuum chuck assembly. The first data is stored in memory with each wafer location being uniquely identified by reference to the X and $\theta$ coordinates of the X, $\theta$, and Z assembly relative to a home position. The capacitive sensing head is further operative to provide second data of the wafer locations of the wafer in an upside-down condition as controllably positioned therein successively by the X, $\theta$, and Z movable vacuum chuck assembly, and the second data is stored in memory with each wafer location being uniquely identified with respect to its inverted position relative to the home position of the X, $\theta$, and Z assembly. First signal processing means are disclosed operative in response to the first rightside-up and the second upside-down data to separate the X dependant errors for each wafer location, which is stored in memory. The capacitive sensing head is further operative to respectively provide third and fourth data representative of the distance to the median wafer centerline of each of the wafer locations of the upside-down wafer respectively relative to first and second preselected offsets in the $\theta$ coordinate defined relative to the home position of the X, $\theta$, and Z assembly. The upside-down third and fourth data for the first and second $\theta$-offset starting positions for each wafer location are stored in corresponding memory locations, uniquely identified with respect to the differently offset starting positions of the X, $\theta$, and Z assembly. Second signal processing means are disclosed operative in response to the third and fourth data to separate the $\theta$ dependant errors for each wafer location, which is stored in memory. Third signal processing means are disclosed for compensating the X and the $\theta$ dependant fixture-induced errors out of the first data, and the bow/warp station of the present invention therewith provides high-confidence bow/warp output data with a tolerance not limited by the mechanical tolerances of the X, $\theta$, and Z assembly. Since the X and $\theta$ dependant errors are repeatable run-to-run, the X and $\theta$ calibration sequence needs only be performed once. Thereafter, and for subsequent wafers high-confidence bow and warp profiles are simply obtained by compensating the measurement data for the already determined X and $\theta$ dependent fixture-induced errors. The processing means preferably includes a central control processor and a bow/warp station processor slaved to the central control processor. The first, second, third, and fourth data preferably are compiled for each measurement run by sampling wafer locations in concentric rings on outer wafer regions and by sampling selected wafer locations on inner regions of the wafer.

BRIEF DESCRIPTION OF THE DRAWINGS

These and other features and attendant advantages of the present invention will become apparent as the invention becomes better understood by referring to the following solely exemplary and non-limiting detailed description of a preferred embodiment thereof, and to the drawings, wherein:

FIG. 1 is a block diagram illustrating one exemplary system where a bow and warp station constructed in accordance with the present invention has exemplary utility;

FIG. 2 is a block diagram illustrating the bow and warp station constructed in accordance with the present invention;

FIG. 3 is a flow chart illustrating the way the dedicated bow and warp station processor executes the central control processor commands downloaded thereto of the bow and warp station constructed in accordance with the present invention;

FIG. 4 is a pictorial diagram useful in explaining the way machining tolerances introduce X and $\theta$ dependant error components of the bow and warp station constructed in accordance with the present invention;

FIG. 5 shows in FIGS. 5A through 5D thereof schematic memory diagrams useful in explaining the way the plural wafer sample locations are uniquely identified of the bow and warp station constructed in accordance with the present invention;

FIG. 7 is a pictorial diagram useful in illustrating the presently preferred way the wafer to be profiled is sampled in outer and in inner regions thereof of the bow and warp station constructed in accordance with the present invention; and.

FIG. 8 is a flow chart illustrating the presently preferred processing sequence for normal measurement after the fixture has been calibrated.

DETAILED DESCRIPTION OF THE PREFERRED EMBODIMENT

Figure 6A:
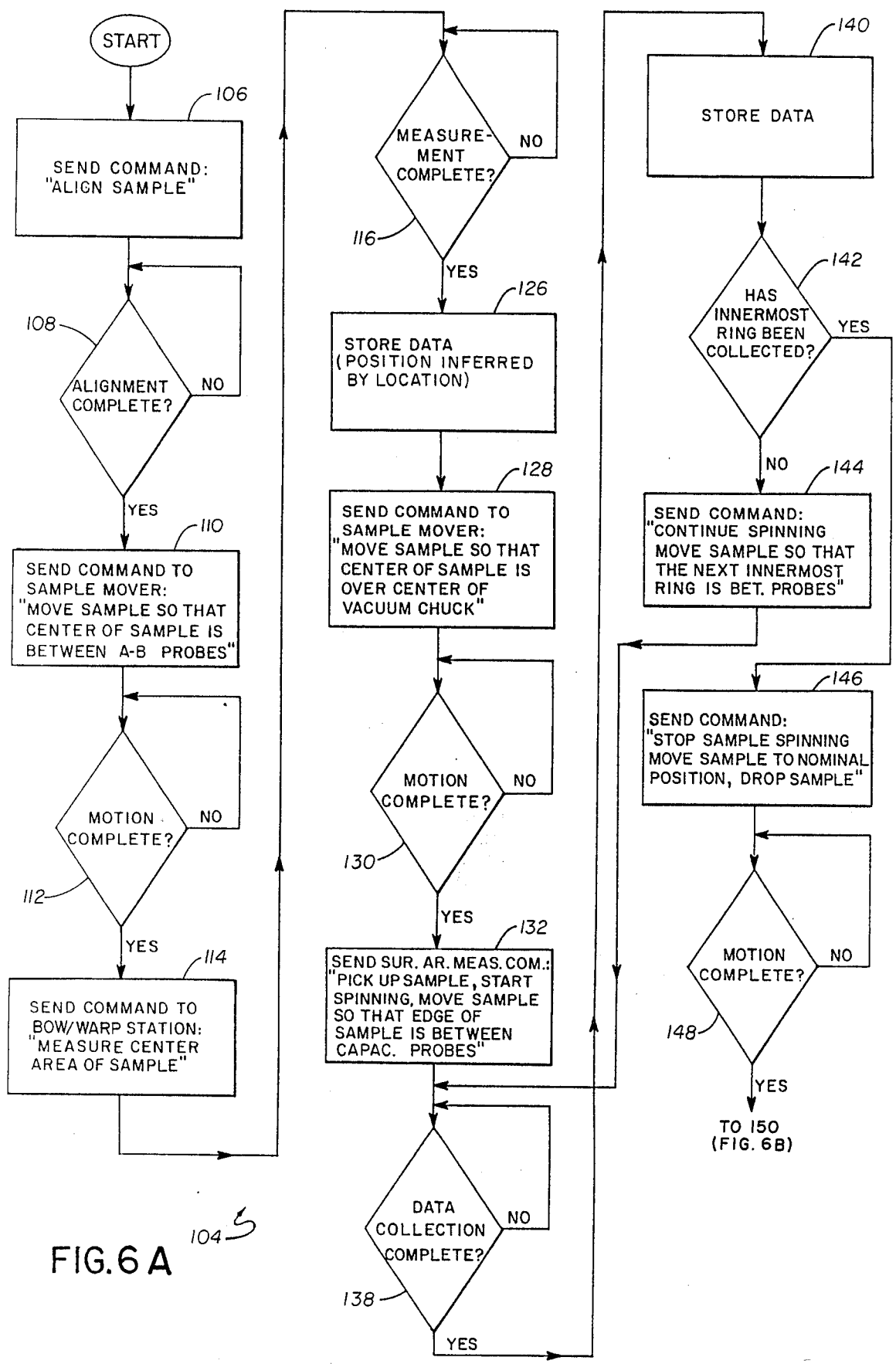
FIG. 6 shows a flow chart in FIGS. 6A and 6B thereof illustrating the presently preferred flow of processing of the central control processor of the bow and warp station constructed in accordance with the present invention.

The principles that underlie the present invention have exemplary utility as a bow/warp station to be described, but are applicable to any measurement system and situation where the measurements taken of a sample to be measured are subject to undesirable sample fixture induced measurement error components. Referring now to FIG. 1, generally designated at 10 is a block diagram illustrating one exemplary system where the bow and warp station of the present invention has exemplary utility. The system 10 includes a central control processor 12 operatively connected to an alignment station 14, a bow and warp station 16, and a sample mover 18. The sample mover 18 may, for example, be a pair of spaced rubber belts, for moving samples, such as semiconductor wafers, sequentially through the alignment station 14 and bow and warp station 16. The belts may be of the type shown and described in commonly assigned U.S. Utility patent application Ser. No. 725,159 now U.S. Pat. No. 4,722,059, incorporated herein by reference. The wafers may, for example, be loaded on the belts by automated wafer elevators, not shown, to the left of the figure. The elevators may be of the type described and claimed in commonly assigned U.S. Utility patent application Ser. No. 379,559 now abandoned as part of F.W.C. Ser. No. 851,297 now abandoned, incorporated herein by reference.

The central control processor 12 is operative to actuate the sample mover 18 to move each wafer into the alignment station 14. Although any suitable means may be employed to align the wafer, it is preferred that the wafer alignment station disclosed and claimed in commonly assigned U.S. Pat. No. 4,457,664 entitled WAFER ALIGNMENT STATION, incorporated herein by reference, be employed. The central control processor is then operative to command the alignment station to center the wafer about its centroid and selectively orient its flat or other fiducial indicia in a predetermined orientation. After the wafer is centered and oriented, the central processor is operative to command the sample mover 18 to move the centered and oriented wafer into a wafer-receiving fixture of the bow and wafer station 16. The bow and warp station 16 is then operative to compile a first data base to be described that profiles the centered and oriented wafer. The wafer is then removed from the bow and warp station 16, is flipped-over, and is positioned back into the alignment station. The central control processor then moves the centered and flipped over wafer into the bow and warp station, and it is operative to compile a second data base to be described that profiles the same points but of the centered and flipped over wafer. The processor 12 is then sequentially operative to command the bow and warp station to compile third and fourth data bases to be described each with respect to a different relative orientation of the flipped-over and centered wafer and wafer fixture. The first, second, third, and fourth data bases are selectively combined in a manner to be described to separate out fixture-related errors induced into the measurements from the desired wafer-related characteristics. The processor 12 is then operative to command the sample mover to move the wafer either to other selected wafer characterization stations or to an automated wafer elevator for unloading, both not shown, to the right of the figure. Once the fixture-related errors are determined, the measurements on subsequent wafers moved into the bow and warp station are readily profiled after compensating the measurement data for the same fixture induced errors.

Referring now to FIG. 2, generally designated at 20 is a block diagram illustrating the bow and warp station constructed in accordance with the present invention. The bow and warp station 20 includes a vacuum chuck 22 for removably holding a wafer 24 (or other sample), and a sensor generally designated 26 positioned near the chuck 22 that is operative to measure the distance to a preselected surface of any region of the wafer 24 brought into operative proximity with the sensor. The wafer 24 is of unknown, typically non-zero, bow and/or warp. The sensor 26 preferably consists of a first probe 28 designated "A", and a second spaced-apart probe 30 designated "B" defining therebetween a measuring head generally designated 32. The probes 28, 30 are preferably capacitive sensors. Probe 30 is fixably mounted to a support 34. Probe 28 is mounted in an arm 36 that is threadably fastened as at 38 for relative motion with respect to the support 34 so that the size of the head 32 can be controllably adjusted. An analog signal conditioning unit 39 designated "A+B" connected to the output of the probes 28, 30 is operative to provide an analog signal representative of the sum of the probe A and probe B outputs of successive ones of a plurality of preselected points of the wafer to be described that are successively positioned in the head 32. An analog signal conditioning unit 40 designated "A−B" connected to the output of the probes 28, 30 is operative to provide an analog signal representative of the difference of the probe A and probe B outputs of successive ones of a plurality of preselected points of the wafer to be described that are successively positioned in the head 32. As will readily be appreciated by those skilled in the art, the "A+B" output represents wafer thickness, while the "A−B" output represents distance, for example to the wafer median centerline, for each wafer location. A multiplexer 41 is coupled to the A+B and to the A−B outputs of the units 39,40. The "A+B" output is useful for flatness profiling, among other things, as disclosed and claimed in commonly assigned U.S. utility patent application Ser. No. 572,695 entitled WAFER FLATNESS STATION, incorporated herein by reference. The "A−B" output, as such, is used for bow and warp measurement and compensation to be described. An analog to digital converter 42 is connected to the output of the multiplexer 41 for providing data preferably representative of the distance to the wafer median surface of each preselected wafer location. While any suitable probes 28, 30 may be employed, it is preferred that the capacitive gauging system disclosed and claimed in commonly assigned U.S. Pat. No. 3,990,005 entitled CAPACITIVE THICKNESS GAUGING FOR UNDERGROUNDED ELEMENTS, incorporated herein by reference, be employed.

An X, $\theta$, and Z assembly 44 is operatively connected to the vacuum chuck 22 for rotating the chuck abouts it axis $\theta$ radians, for moving the vacuum chuck along an X axis, and for moving the chuck along a Z axis. The X, $\theta$, and Z assembly 44 is responsive to a plurality of control signals to be described to controllably manipulate the chuck to position successive ones of the preselected plurality of locations of the wafer 24 into proximity with the capacitive sensing head 32 that are preferably selected to cover the entire special extent of the wafer 24 during compilation of the first, second, third, and fourth data bases. While any suitable X, $\theta$, and Z assembly can be employed, the X, $\theta$, and Z assembly shown and described in the above-incorporated U.S. Patent entitled WAFER ALIGNMENT SYSTEM is presently preferred.

A dedicated bow and warp station processor 46 is connected to the analog to digital converter 42 over a data bus 48. The processor 46 is operatively connected to the X, $\theta$, and Z assembly 44 over the data bus 48 via a conventional latched drivers 50. The processor 46 has RAM 52 and PROM 54 associated therewith in the usual manner. A central control processor 56 is connected to the data bus 48 via a communication link, preferably an IEEE 488 bus 58 and an IEEE 488 interface 60. The processor 46 is slaved to the central control processor 56 and executes instructions to be described downloaded thereto by the central control processor 56 that command it to controllably rotate and translate the chuck 22 to bring the preselected wafer points that are located about the center area of the wafer and then to bring preselected points that are located surrounding the center area of the wafer into the capacitive sensing head. Concurrently therewith, the processor 46 reads the output of the A/D converter 42 for each such point and writes it into a RAM memory location via the bus 48. As appears more fully below, the address of each such location for the several data bases corresponds to the special location of the associated center or surrounding point location on the wafer as determined by the state of the X, $\theta$, and Z assembly 44. After data collection is complete, the processor 46 sends the data back to the central control processor.

The processor 46 is operative in response to the commands downloaded thereto by the central control processor 56 to produce X, $\theta$, Z and vacuum control signals via the data bus 48 to the drivers 50 for controlling the state of actuation of an X stepper motor, a $\theta$ stepper motor, a Z actuator, and the condition of the vacuum. In response to the X control signal, the shaft of the X stepper motor is controllably turned and rotates a worm gear the threads of which engage a threaded housing slidably mounted in linear guide rails for controlling the position of the chuck along the X axis. Likewise, the $\theta$ coordinate of the chuck is controlled by the shaft of the $\theta$ stepper motor over a belt and wheel assembly in response to the $\theta$ control signal, and the Z coordinate of the chuck is controlled by the Z actuator in response to the Z control signal. The "ON" and the "OFF" state of the vacuum applied to the vacuum chuck is controlled by a vacuum line, when "ON", the wafer is sucked-down by the chuck, and when "OFF", it is released from the chuck.

Referring now to FIG. 3, generally shown at 60 is a flow chart illustrating the operation of the slaved bow and warp station processor according to the present invention. The control processor 56 downloads commands to the CPU 46, which accepts the commands from the central processor as shown by a block 62. The bow and warp station processor 46 decodes the commands and fetches from the PROM 54 (FIG. 2) the code that specifies the corresponding X, $\theta$, Z and vacuum actuators to move successive ones of a plurality of preselected points within the capacitive sensing head 32 (FIG. 2) as shown by a block 66, and the bow and warp station processor continues until execution of the commands are completed as shown by a block 68. For each wafer location point the processor is operative to store the corresponding value of the analog to digital converter 40 (FIG. 2) in a corresponding one of the first, second, third, and fourth data tables in RAM 42 (FIG. 2) to be described at preselected address locations thereof that respectively correspond to the position of each point of the wafer as determined by the $\theta$ motor rotary position and X motor rotary position as shown by a block 70. As shown by a block 72 after the measurements for each command to be decribed are completed, the bow and warp station processor is operative to send the data back to the control processor.

Referring now to FIG. 4, generally designated at 74 is a pictorial diagram useful in explaining the way that the X, $\theta$ and Z assembly introduces undesirable error components in the bow/warp measurements. The X drive subassembly includes a rail-guided carriage schematically illustrated at 76 that follows the threads of an X worm drive coupled to the shaft of the X stepper motor, both not shown. Ideal rails, ones that are perfectly true, are schematically illustrated by a solid line 78, and the actual guide rails, ones that are true to the extent of their mechanical and machining tolerances, are schematically illustrated by an undulatory line designated 80. The maximum change therebetween is schematically illustrated by an arrow 82 designated "D". In a practicable embodiment, the actual versus the ideal rails can vary on the order of ±0.004 inches (±101.6 microns). As will be appreciated, the actual variation therebetween locally displaces the wafer 24 in the Z direction producing an A−B error component directly proportional to the difference from the ideal rail.

The $\theta$ drive subassembly includes the $\theta$ stepper motor coupled via a belt and wheel arrangement to the chuck 22 that is journaled in bearings for $\theta$ rotation about the Z axis. The ideal spin axis is schematically illustrated by a dashed line 84, while the actual spin axes are multiple as schematically illustrated by lines 86. The differences between the actual spin axis and the ideal spin axis introduce an error in the Z position of the wafer 24 that varies with the X and $\theta$ displacement, and it is produced by such mechanical sources as non-true bearing races and wafer-to-shaft non-perpendicularity. In a practicable embodiment and for an exemplary 150 mm wafer, the Z-error at the chuck is approximately ±0.0022 inch (±56.25 microns). In accordance with the present invention, these platform induced error components are electronically determined separately as an X dependant component and as a $\theta$ dependant component. The X calibration and the $\theta$ calibration are both determined for repeatable X, $\theta$, and Z assembly performance. The X-calibration is further determined for $\theta$ coordinate invariance and, the $\theta$-calibration is further determined for X coordinate invariance.

X-CALIBRATION

The first measurement ($M_1$) for each wafer location to be described brought into the capacitive sensing head can be expressed as having a desired wafer related component ($M_w$) and an undesired fixture related component ($M_c$), as follows:

$$M_1(X, \theta) = M_w(X, \theta) + M_c(X, \theta) \tag{1}$$

where $M_1$, $M_w$, and $M_c$ are matrices.

The $M_1(X, \theta)$ data is schematically illustrated generally at 88 in FIG. 5A in a table format, and it is compiled and temporarily stored in the RAM 52 (FIG. 2) in such a way that each of the plural locations of the wafer to be bow/warp profiled to be described is assigned to a unique address location thereof determined by that (X, $\theta$) coordinate pair that represents the corresponding X and $\theta$ position of the X, $\theta$ and Z assembly as the measurements are taken (block 70 of FIG. 3) of the corresponding locations of the wafer relative to a first predetermined X, $\theta$, and Z "home" position. As illustrated by an arrow 90 in FIG. 5A, the $M_1$ data for the several wafer locations successively brought into the sensing head by the X, $\theta$, and Z assembly are serially stored in RAM beginning within the (0,0) address location until the data table is filled.

After measurement of all of the preselected locations of the wafer is completed, the wafer is flipped-over, and brought into the bow and warp station for measurement of its flip-side relative to the first home position. The measurements ($M_2$) for each wafer location to be described brought into the capacitive sensing head of the flipped-over wafer likewise have a wafer related component ($M_w$) and a fixture-related component ($M_c$). The measurements of the same but flipped-over wafer locations can be shown to be the negative of the backward frontside measurements for the rightside-up wafer, and is expressed as follows:

$$M_2(X, \theta) = -M_w(X, -\theta) + M_c(X, \theta) \tag{2}$$

where $M_2$, $M_w$, and $M_c$ are matrices.

The $M_2$ data is schematically illustrated generally at 92 in FIG. 5b in a table format, and it is temporarily compiled in the RAM 52 (FIG. 2) such that each of plural wafer locations to be described successively brought into the capacitive sensing head are written into the address locations provided therefor but in reverse order as illustrated by an arrow 94 as determined by the (X, $\theta$) coordinate pair of the X, $\theta$ and Z assembly defined relative to the same "home" position as for the front-side wafer measurements.

The $M_1$ and $M_2$ data are combinable by matrix addition to separate out the chuck-related X dependant error component ($M_c(X, \theta)$) representative of the X-fixture induced errors, as follows:

$$M_1 + M_2 = M_2(X, \theta) - M_w(X, -\theta) + M_c(X, \theta) + M_c(X, \theta), \tag{3}$$

which after cancellation and term rearrangement, becomes:

$$M_c(X, \theta) = (M_1(X, \theta) + M_2(X, \theta))/2. \tag{4}$$

$\theta$-CALIBRATION

After measurement of the flipped-over wafer is completed and the $M_2$ data table is filled, the flipped-over wafer is released by the chuck and the chuck alone is rotated a preselected number of steps ($\theta_1$) in the $\theta$ direction defining a second "home" position offset from the old "home" position by the preselected $\theta_1$ offset. The flipped-over wafer is then chucked and the same preselected locations thereof are brought into the capacitive sensing head for measurement, and as expressed in matrix format, are as follows:

$$M_3(X, \theta) = M_w(X, \theta) + M_c(X, \theta - \theta_1) \tag{5}$$

The $M_3$ data is schematically illustrated generally at 96 in FIG. 5C in a table format, and it is temporarily compiled in the RAM 52 (FIG. 2) in such a way that each wafer location to be described is stored at an associated RAM address location that represents the corresponding X and $\theta$ coordinate of the X, $\theta$, and Z assembly as the measurements are taken (block 70 in FIG. 3) for the corresponding locations of the wafer relative to the first offset "home" position as shown by an arrow 98.

After measurements of the flipped-over wafer relative to the first "offset" home position is completed and the $M_3$ data table is filled, the wafer is released by the chuck and the chuck is again rotated a preselected number of steps ($\theta_2$) different from $\theta_1$ to define a third "home" position different from the second "home" position used for compiling the $M_3$ data table. The wafer is chucked again, and the same preselected wafer locations are brought into the capacitive sensing head for measurement relative to the third "home" position, the resulting measurements ($M_4$) being expressed as follows:

$$M_4(X, \theta) = M_w(X, \theta) + M_c(X, \theta - \theta_2) \tag{6}$$

The $M_4$ data is schematically illustrated generally at 100 in FIG. 5d in a table format, and it is temporarily compiled in the RAM 52 (FIG. 2) in such a way that each wafer location to be described is stored at an associated RAM address location that represents the corresponding X and $\theta$ position of the X, $\theta$, and Z assembly as the measurements are taken (block 70 of FIG. 3) for the corresponding locations of the wafer relative to the third offset "home" position as shown by an arrow 102.

To separate out of the measurements the $\theta$-dependent Z-error component, first combine equations (2) and (5) by matrix substraction as follows:

$$M_2(X, \theta) - M_3(X, \theta) = M_w(X, \theta) + M_c(X, \theta) - M_w(X, \theta) - M_c(X, \theta - \theta_1), \tag{7}$$

By algebraic manipulation, equation (7) can be written:

$$i_1(\theta) = M_c(\theta) - M_c(\theta - \theta_1), \tag{8}$$

where $i_1(\theta)$ is an intermediate variable defined as equal to the left hand side of equation (7).

Take now the fourier transform of equation (8), as follows:

$$I_1(\omega) - W(\omega) - W(\omega - \theta_1),\quad (9)$$

where $I_1(\omega)$ is the fourier transform of $i_1(\theta)$, $W(\omega)$ is the fourier transform of $M_c(\theta)$, and where $W(\omega - \theta_1)$ is the fourier transform of $M_c(\theta - \theta_1)$.

Equation (9) can be written as follows:

$$I_1(\omega) = W(\omega)(1 - e^{-j\theta_1\omega}).\quad (10)$$

Next, combine equations (2) and (6) by matrix subtraction, as follows:

$$M_2(X, \theta) - M_4(X, \theta) = M_w(X, \theta) + M_c(X, \theta) - M_w(X, \theta) - M_c(X, \theta - \theta_2)\quad (11)$$

rearrange, and then simplify equation (11), as follows:

$$i_2(\theta) = M_c(\theta) - M_c(\theta - \theta_2),\quad (12)$$

where $i_2(\theta)$ is a second intermediate variable defined to be equal to the left hand side of equation (1).

Then take the fourier transform of equation (12), as follows:

$$I_2(\omega) = W(\omega) - W(\theta - \theta_2),\quad (13)$$

where $I_2(\omega)$ is the fourier transform of $i_2(\theta)$, and where $W(\omega)$ and $W(\omega - \theta_2)$ respectively are the fourier transforms of $M_c(\theta)$ and $M_c(\theta - \theta_2)$.

Equation (13) can be written as:

$$I_2(\omega) = W(\omega)(1 - e^{-j\theta_2\omega})\quad (14)$$

Equations (10) and (14) are then combinable by a preselected weighting function to smooth-out undesirable noise-effects. Preferably, the weighting function is in the form of a linear combination, as follows:

$$I_3(\omega) = \alpha(\omega)I_1(\omega) + \beta(\omega)I_2(\omega),\quad (15)$$

where $I_3(\omega)$ is a third variable defined to be equal to the linear combination, $\alpha(\omega)$ is equal to $|\delta|^2\gamma/(|\gamma|^2 + |\delta|^2)$, $\beta(\omega)$ is equal to $|\gamma|^2\delta/|\gamma|^2 + |\delta|^2$, $\gamma$ is equal to $1/(1 - e^{-j\theta_1\omega})$, and where $\delta$ is equal to $1/(1 - e^{-j\theta_2\omega})$.

The inverse fourier transform of equation (15), $w_3(X, \theta)$, then, represents the $\theta$ dependent error component of the X, $\theta$, and Z assembly.

In the preferred embodiment the number of steps ($\theta_n$) of the $\theta$ motor is selected to be equal to one hundred (100) steps, and as appears below, it is important that the offsets in the $\theta$ coordinates, namely $\theta_1$, $\theta_2$, be selected to be relatively prime with each other and with $\theta_n$; otherwise, and as will be appreciated, $\delta$ and $\gamma$ blow up mathematically. In the preferred embodiment, $\theta_1$ is selected to be equal to seventeen (17) steps and $\theta_2$ is selected to be equal to twenty-three (23) steps.

Referring now FIG. 6, generally designated at 104 is a flow chart illustrating the operation of the central control processor of the bow and warp station constructed in accordance with the present invention. As shown by a block 106, the central control processor is operative to send a command to the alignment station 14 (FIG. 1) to align the wafer just moved into the station about its centroid and to orient its flat in space, and waits until the alignment is complete as shown by a block 108. As shown by a block 110, the central control processor is then operative to send a command to the sample mover 18 (FIG. 1) to move the aligned sample such that the centroid of the sample is positioned in the capacitive sensing head 32 (FIG. 2), and waits until the motion is complete as illustrated by a block 112. As shown by a block 114, the central control processor is then operative to send a command to the bow and warp station processor to measure the center area of the sample.

The central control processor waits until the data representative of the center area of the wafer has been received as shown by a block 116. The "measure center area of sample" command is executed by the bow and warp station processor in accordance with the instructions corresponding thereto stored in its PROM control table. As shown in FIG. 7, the bow and warp station processor is preferably operative to move the chuck from its "home" position along the X axis to a position 118 designated by a "X" intermediate the periphery of the water and the center point, and then actuates the vacuum to pick up the wafer. The processor is then operative to actuate the X stepper motor to bring the wafer center point designated by a dot 120 within the capacitive sensing head of the sensor. The processor is then operative to release the wafer, and to actuate the X, $\theta$ stepper motors to move the chuck back to its home position. The processor is then operative to pick up the wafer, and then to move three wafer points 122, 123, 124 located on an inner ring of the wafer successively within the capacitive sensing head. For each of the points 120, 122, 123, 124, the corresponding measurement is temporarily stored in RAM.

Returning now to FIG. 6, the processor is operative to store the wafer data received back from the bow and warp station processor in the appropriate $M_1$ data table locations (FIG. 5A) as shown by a block 126. As shown by a block 128, the central control processor is then operative to send a command to the sample mover 18 (FIG. 1) to move the sample so that the center of the sample is over the center of the vacuum chuck at its "home" position, and waits until the motion is complete as shown by a block 130. As shown by a block 132, the central control processor is then operative to send a command to the bow and warp station processor to measure the area of the wafer surrounding the center area of the wafer.

The bow and warp station processor accepts the command to measure the area surrounding the center area of the wafer downloaded thereto by the central control processor, and decodes the command and fetches from the PROM 54 (FIG. 2) the code that specifies the corresponding X, $\theta$, Z and vacuum control signals that implement the "surrounding area measure" command. The processor is then operative to produce control signals to the X, $\theta$, Z and vacuum actuators to move successive ones of a plurality of preselected points selected to cover the entire area of the sample surrounding the center area of the sample within the capacitive measuring head. The bow and warp station processor executes the "surrounding area measure" command in preferred embodiment as shown in FIG. 7. The area surrounding the center area of the sample is measured by successively taking a plurality of predetermined data points arrayed in concentric rings beginning with an outermost ring first and working inwardly therefrom until the innermost ring is taken. Preferably, the central control processor instructs the bow and warp station processor to do each such ring sequentially. The bow and warp station processor is operative to actuate the vacuum to pick up the wafer at its center point 134 and to actuate the X stepper motor to translate the chuck until an outermost ring 136 is positioned in the capacitive sensing head as shown in FIG. 7. The processor is then operative to actuate the $\theta$ stepper motor to successively bring a plurality of preselected points, three being specifically illustrated as "dots", located on the outermost ring 136 successively into proximity with the capacitive sensing head. The bow and warp station processor rotates the $\theta$ stepper motor taking the measurements for the complete ring. For each such ring point location the processor is operative to store the reading of the analog to digital converter 42 (FIG. 2) in the data table in RAM 52 (FIG. 2) at preselected address locations thereof that respectively correspond to the position of each such point on the ring 136 as determined by the $\theta$ motor rotary position and the X motor rotary position relative to the "home" position. Preferably, one hundred (100) steps of the $\theta$ motor are selected to cover one full rotation thereof. After the points of the outermost ring are collected in local bow and warp memory, the processor is operative to transmit the data back to the central control processor as shown by the block 72 (FIG. 3).

Returning now to FIG. 6, the central control processor waits until the data for the outermost ring is collected as shown by a block 138, and is then operative to store the received data representative of the distance of the wafer median center line of the points along the outermost ring as shown by a block 140. If the innermost ring has not yet been collected as shown by a block 142, the central control processor is operative to send a command to the bow and warp station processor to continue spinning the wafer and to move it to the next inner ring position 144 (FIG. 7) as shown by a block 145. The bow and warp control processor receives the command for the next innermost ring, and the just described process is repeated. As shown by a block 146, after the innermost ring is collected, the central control processor is operative to send a command to the bow and warp control processor to stop the spinning of the sample, to move the vacuum chuck to its nominal "home" position and drop the sample, and waits until the motion is complete as shown by a block 148.

As shown by a block 150, the central processor then stores the transmitted data sent thereto by the bow and warp station in the first data table $M_1$ in its associated memory.

The wafer is then flipped-over, and placed back on the sample mover, and the same steps (106–116, 126–132, 138–150) are repeated by the central processor as shown by a block 152. The data for the flipped-over wafer is the reverse of the backward frontside data, and it is stored by the same process in the second data table $M_2$ (FIG. 5b) in the central control processing RAM.

As shown by a block 154, the processor is then operative to send a "rotate $\theta_1$" command to the bow and warp station processor. The processor waits until the command is executed thereby as shown by a block 156.

After the $\theta$ assembly is preferably rotated by seventeen (17) steps, the steps described above in obtaining the $M_1$ and $M_2$ data bases are repeated, and the resulting data representative of the distance to the median center line of the wafer locations relative to the $\theta_1$ offset "home" position are stored in the third data table $M_3$ (FIG. 5c) in CCP RAM as shown by a block 158.

As shown by blocks 160, 162, 164, the central control processor then obtains the fourth data table $M_4$ (FIG. 5d) in its RAM by repeating the same steps, but preferably with a 23 step offset in the "home" position of the $\theta$ sub-assembly.

As shown by a block 166, the CCP processor is then operative to separate the X dependant errors from the wafer-related components by means of software implementing equations (1) through (4) described above, and to separate out the $\theta$ dependant errors from the wafer-related component by means of software implementing equations (5) through (15), described above, as shown by a block 168, which are stored in memory.

As shown by a block 170, the central control processor is then operative to compensate the measurement data for the X and $\theta$ error components leaving only data representative of the wafer related component as shown by a block 170. This data can be suitably manipulated to determine, among other things, the warp and bow of the wafer as shown by a block 172. A representative computational algorithm for the warp determination is as follows: warp $(X, \theta) = M_1(X, \theta) - (M_c(X, \theta) + W_3(X, \theta))$.

Referring now to FIG. 8, generally designated at 180 is a flow chart illustrating the normal measurement sequence. Wafers subsequently moved into the bow and warp station are bow and warp profiled by first obtaining the $M_1(X, \theta)$ data as shown by a block 182, and the already determined X-calibration $(M_c(X, \theta))$ and the $\theta$-calibration $(W_3(X, \theta))$ fixture errors are compensated out as shown by a block 184. As shown by a block 186, the compensated measurement data can then be processed to provide the high confidence bow and warp profiles of the preferred embodiment.

Many modifications of the presently disclosed invention will become apparent to those skilled in the art without departing from the scope of the appended claims.

What is claimed is:

1. A measurement system, comprising:
   a sensor for obtaining input data representative of an intended characteristic associated with one or more identifiable locations of an object to be measured;
   a fixture for supporting the object in plural orientations in such a way that the sensor can obtain multiple input data respectively representative of the intended characteristic associated with the one or more identifiable locations of the object in the different orientations;
   means for obtaining multiple input data respectfully representative of the intended characteristic associated with the one or more identifiable locations of the object in the different orientations;
   first signal processing means responsive to the multiple input data for separating the multiple input data for the one or more identifiable locations into a fixture-related error component and an intended characteristic-related desired component; and
   second signal processing means responsive to the input data and to the fixture-related error component to provide output data only representative of the intended characteristic associated with the object at the one or more identifiable locations thereof.

2. The measurement system of claim 1, wherein said sensor is a capacitive sensor.

3. The measurement system of claim 1, where said fixture is defined with respect to a coordinate system, and wherein said one or more identifiable locations of the object are identified with respect to the fixture coordinate system.

4. The measurement system of claim 3, wherein the multiple input data includes multiple representations for the same one or more locations identified with respect to different relative orientations of the object and the fixture coordinate system.

5. The measurement system of claim 1, wherein said fixture is an X, $\theta$, and Z moveable assembly, and said object is a flat disc.

6. Measurement apparatus for separating fixture-induced errors from measurement data, comprising:
   a sensor;
   an object receiving fixture defined with respect to a fixture coordinate system;
   first signal processing means for obtaining first data representative jointly of an intended characteristic component and a fixture error component associated with determinable locations of an object received by the fixture determined by a first relative orientation of the object and the fixture coordinate system, and for obtaining second data representative jointly of the same intended characteristic component and the same fixture error component associated with the object received by the fixture but where the same determinable locations are determined by a second relative orientation of the object and the fixture coordinate system different from the first relative orientation; and
   second signal processing means responsive to the first and the second data for providing third data representative of the fixture related error component for each of the said locations of the object.

7. The measurement apparatus of claim 6, wherein said sensor is a capacitive sensor.

8. The measurement system of claim 7, wherein said capacitive sensor includes first and second capacitive probes that provide a difference output signal therebetween.

9. The measurement system of claim 6, wherein said object receiving fixture includes an X, $\theta$, and Z assembly having an object receiving chuck that is rectilinearly moveable in X and angularly moveable in $\theta$.

10. The measurement apparatus of claim 6, wherein said first signal processing means is connected to said sensor and said fixture.

11. The measurement apparatus of claim 6, wherein said first relative orientation and said second relative orientation are different in that the orientation of the object relative to the same fixture coordinate system is different in each case.

12. The measurement apparatus of claim 11, wherein said sample is a flat disc.

13. The measurement apparatus of claim 12, wherein said flat disc is a semiconductor wafer.

14. The measurement apparatus of claim 6, wherein the first relative orientation and said second relative orientation are different in that the fixture coordinate system is different relative to the same orientation of the object in each case.

15. The measurement apparatus of claim 14, wherein said sample is a flat disc.

16. The measurement system of claim 15, wherein said flat disc is a semiconductor wafer.

17. A bow and warp proofing station, comprising a capacitive sensing head;
   an X, $\theta$, and Z moveable vacuum chuck assembly for receiving a semiconductor wafer to be profiled;
   a processing means operatively coupled to said capacitive sensing head and to said X, $\theta$, and Z moveable vacuum chuck assembly;
   first means connected to said capacitive sensing head and to said processing means for providing first input data representative of the distance to the median centerline of each of a plurality of identifiable locations of a right-sideup wafer controllably positioned successively in the capacitive sensing head by the X, $\theta$, and Z moveable vacuum chuck assembly;
   a memory;
   means connected to said first means for storing said first input data in the memory with each wafer location being uniquely identified by reference to the X and coordinates of the X, $\theta$, and Z assembly relative to a first home position;
   second means connected to said capacitive sensing head and to said processing means for providing second input data representative of the distance to the median centerline of each of a plurality of identifiable locations of the same but upside-down wafer controllably positioned successively in the capacitive sensing head by the X, $\theta$, and Z moveable vacuum chuck assembly;
   means for storing the second input data in memory with each wafer location of the upside-down wafer being uniquely identified with respect to its inverted position relative to the first home position of the X, $\theta$, and Z assembly;
   means connected to said memory and said processing means and responsive to the first and second data to separate an X-component error for each wafer location; and
   means for storing said X-component error data in memory.

18. The bow and warp profiling station of claim 17, further including means connected to said processing means responsive to said first input data and to said X-component error data to provide first output data compensated for the X-error component.

19. The bow and warp station of claim 18, further including third means connected to said capacitive sensing head and to said processing means for providing third data representative of the distance of the median centerline of each of said plurality of identifiable upside down locations of the wafer controllably positioned successively therein by the X, $\theta$, and Z moveable vacuum chuck assembly; and
   means for storing in the memory the third data with each wafer location being uniquely identified by reference to the X and $\theta$ coordinates of the X, $\theta$, and Z assembly relative to a second home position offset in $\theta$ from the said first home position by a preselected $\theta$ offset.

20. The bow and warp station of claim 19, including means connected to the processing means and responsive to the second and to the third data to separate a $\theta$ component error for each wafer location.

21. The bow and warp station of claim 20, further including means responsive to the $\theta$ component error data and to said first input data to provide second output data compensated for said $\theta$-error component for each of the wafer locations.

22. The bow and warp station of claim 21, further including means responsive to at least one of said first output data and to said second output to provide a bow and warp profile of a semiconductor wafer received on said chuck assembly.

23. The bow and warp station of claim 19, including;
fourth means connected to said capacitive sensing head and said processing means operative to provide fourth data of the wafer locations of the wafer in said upside-down condition as controllably positioned therein successively by the X, $\theta$, and Z moveable vacuum chuck assembly;

means for storing the fifth data in memory with each wafer location being uniquely identified by reference to the X and $\theta$ coordinates of the X, $\theta$, and Z assembly relative to a third offset position offset in $\theta$ from the second offset home position and the said first home position by a second $\theta$ offset different from said first $\theta$ offset; and means connected to the processing means and responsive to the second, third and fourth data for separating a $\theta$ component error for each wafer location.

24. The bow and warp station of claim 23, further including means responsive to the $\theta$ component error data and to said first input data to provide second output data compensated for said $\theta$-error component for each of the wafer locations.

25. The bow and warp station of claim 24, further including means responsive to at least one of said first output data and to said second output to provide a bow and warp profile of a semiconductor wafer received on said chuck assembly.

26. A process for separating system components and element parameter components of an element measuring system, comprising:

positioning said element in a first orientation at a station of said measuring system;

measuring said element parameter by means of said measurement system to provide a first output indication of element parameter referenced to a selected location on said element;

said first output indication being a first function of a component representative of the element parameter of said location and a component representative of unknown measurement system characteristics;

positioning said element in a second orientation at said station of said measurement system;

measuring said element parameter by means of said measurement system to provide a second output indication of element parameter referenced to said location;

said second output indication being a second function of the component representative of the element parameter at said location and the component representative of unknown measurement system characteristics; and mathematically separating the components of said first and second functions from the component representative of the element parameter.

27. The process of claim 26, wherein said element is a semiconductor wafer, and wherein said element measuring system includes a capacitive gauge.

* * * * *

UNITED STATES PATENT AND TRADEMARK OFFICE
CERTIFICATE OF CORRECTION

PATENT NO. : 4,750,141  
DATED : June 7, 1988  
INVENTOR(S) : Neil H. Judell & Noel S. Poduje Page 1 of 2

It is certified that error appears in the above-identified patent and that said Letters Patent is hereby corrected as shown below: Title page:

Abstract, line 12, "objectrelated" should read --object related--

Abstract, line 16, "tolerance" should read --tolerances--.

Abstract, lines 19-20, "contributions fixture induced error are" should read --fixture induced error contributions are--.

Abstract, line 22, "wafer after receiving" should read --wafer receiving--.

Column 4, lines 3-4, "bow and wafer station 16." should read --bow and warp station 16.--

Column 5, lines 13-14, "UN-DERGROUNDED" should read --UN-GROUNDED--.

Column 5, line 17, "abouts it" should read --about its--.

Column 5, line 54, "special" should read --spacial--.

Column 6, line 34, "decribed" should read --described--.

Column 7, line 21, "inatrices." should read --matrices.--.

Column 7, line 64, "data are" should read --data tables are--.

Column 8, line 59, "substraction" should read --subtraction--.

UNITED STATES PATENT AND TRADEMARK OFFICE
CERTIFICATE OF CORRECTION

PATENT NO. : 4,750,141
DATED : June 7, 1988
INVENTOR(S) : Neil H. Judell & Noel S. Poduje It is certified that error appears in the above-identified patent and that said Letters Patent is hereby corrected as shown below:

Column 9, line 23, "equation (1)." should read --equation (11).--

Column 9, line 26, "$I_2(\omega) = W(\omega) - W(\theta-\theta_2)$," should read --$I_2(\omega) = W(\omega) - W(\omega-\theta_2)$,--

Column 10, line 20, "water" should read --wafer--.

Column 11, line 30, "distance of" should read --distance to--.

Column 14, line 41, "warp profiling station" should read --warp proofing station--.

Column 14, line 46, "18, further" should read --18,--.

Signed and Sealed this

Twenty-seventh Day of June, 1989

*Attest:*

DONALD J. QUIGG

*Attesting Officer*   *Commissioner of Patents and Trademarks*